(12) United States Patent
Tsuda et al.

(10) Patent No.: US 6,506,843 B1
(45) Date of Patent: Jan. 14, 2003

(54) THERMOSETTING POWDER COATING COMPOSITION

(75) Inventors: Nobuhiko Tsuda, Settsu (JP); Takahiro Kitahara, Settsu (JP); Ryuji Iwakiri, deceased, late of Minoo (JP), by Miyuki Iwakiri, legal representative; Masaru Nagato, Settsu (JP); Ryoichi Fukagawa, Settsu (JP); Go Nagai, Settsu (JP)

(73) Assignee: Dajkin Industries, Ltd., Osaka (JP)

( * ) Notice: Subject to any disclaimer, the term of this patent is extended or adjusted under 35 U.S.C. 154(b) by 0 days.

(21) Appl. No.: 09/674,314

(22) PCT Filed: Apr. 23, 1999

(86) PCT No.: PCT/JP99/02185

§ 371 (c)(1),
(2), (4) Date: Apr. 6, 2001

(87) PCT Pub. No.: WO99/57209

PCT Pub. Date: Nov. 11, 1999

(30) Foreign Application Priority Data

Apr. 30, 1998 (JP) ............................................ 10-121458
Sep. 21, 1998 (JP) ............................................ 10-266549

(51) Int. Cl.$^7$ ..................... C09D 5/03; C09D 133/06; C09D 127/16
(52) U.S. Cl. ................. 525/199; 525/208; 525/221; 525/222; 525/232; 525/238; 525/241
(58) Field of Search ................................ 525/199, 208, 525/221, 222, 232, 238, 241

(56) References Cited

U.S. PATENT DOCUMENTS 5,229,460 A * 7/1993 Yousuf et al. .............. 525/198
5,593,730 A   1/1997 Satgurunathan et al.

FOREIGN PATENT DOCUMENTS

| EP | 0 135 917 | 3/1985 |
| EP | 0 869 157 A1 | 10/1998 |
| JP | 48-12053 | 4/1973 |
| JP | 52-134637 | 11/1977 |
| JP | 3-7784 | 1/1991 |
| JP | 3-95276 | 4/1991 |
| JP | 4-325509 | 11/1992 |
| JP | 5-247380 | 9/1993 |
| JP | 5-295039 | 11/1993 |
| JP | 6-1943 | 1/1994 |
| JP | 6-25595 | 2/1994 |
| JP | 6-172456 | 6/1994 |
| JP | 6-299115 | 10/1994 |
| JP | 7-41699 | 2/1995 |
| JP | 7-70508 | 3/1995 |
| JP | 7-268163 | 10/1995 |
| JP | 7-509014 | 10/1995 |
| WO | WO 94/06870 | 3/1994 |
| WO | WO 97/22671 | 6/1997 |

OTHER PUBLICATIONS

Supplementary European Search Report for EP 99 91 7139 dated Oct. 15, 2001.
European Office Action for 99 917 139.0 dated Feb. 8, 2002.

* cited by examiner

*Primary Examiner*—Nathan M. Nutter
(74) *Attorney, Agent, or Firm*—Sughrue Mion, PLLC

(57) ABSTRACT

To provide a thermosetting powder coating composition which comprises a powder of a composite resin comprising a vinylidene fluoride polymer having crosslinkable functional group and a methyl methacrylate polymer and having a melt flow rate of 1 to 1,000 g/10 min when measured at 130° C. at a load of 2.1 kg. The coating composition has advantages that the preparation thereof is easy because pulverization can be carried out at room temperature as well as at low temperatures, the composite resin has excellent compatibility with various curing agents and the composition gives a coating film having excellent properties.

8 Claims, No Drawings

THERMOSETTING POWDER COATING COMPOSITION

TECHNICAL FIELD

The present invention relates to a thermosetting powder coating composition comprising a vinylidene fluoride polymer and methyl methacrylate polymer as resin components.

BACKGROUND ART

With respect to a fluorine-containing resin powder coating composition, various proposals have been made hitherto.

For example, with respect to a thermoplastic powder coating composition containing no curing agent, JP-A-4-227743 discloses a powder coating composition comprising a vinylidene fluoride (VdF)/hexafluoropropylene (HFP) copolymer and thermoplastic acrylic resin as resin components, and JP-A-6-108103 discloses a powder coating composition comprising polyvinylidene fluoride (PVdF), thermoplastic resin and VdF/tetrafluoroethylene (TFE)/HFP terpolymer as resin components. However since the thermoplastic powder coating composition is not subjected to curing (crosslinking), a hardness of an obtained coating film does not become high. Also the resin mixtures described in the above-mentioned patent publications cannot be finely pulverized at room temperature, and it is necessary to pulverize at a very low temperature, i.e. at a temperature of a liquid nitrogen, etc.

Also a thermosetting powder coating composition of fluorine-containing resin has been proposed.

For example, JP-A-1-103670 discloses a powder coating composition comprising a fluorine-containing copolymer as a sole resin component. However the fluorine-containing copolymers disclosed therein are only copolymers comprising chlorotrifluoroethylene (CTFE) and/or TFE as main components. Those fluorine-containing copolymers are difficult to be finely pulverized at room temperature and it is necessary to make them into powders by a method of pulverizing at very low temperature as mentioned above. Also a combination use with a thermoplastic resin is not disclosed therein.

JP-A-6-279549 discloses a thermosetting powder coating composition comprising a copolymer of VdF and allyl derivative as a resin component. According to a technique described in that patent publication, the above-mentioned copolymer is used solely as a resin component and though it can be pulverized at room temperature, an appearance such as a gloss of an obtained coating film is not always sufficient.

It is an object of the present invention to provide a thermosetting powder coating composition of VdF polymer which can be finely pulverized at room temperature and gives a coating film having excellent characteristics.

The present inventors have made intensive studies and found that the above-mentioned problems can be solved when a composite resin prepared by introducing crosslinkable functional group in a VdF polymer and further combining the VdF polymer with a methyl methacrylate (MMA) polymer has a specific melt flow rate, and thus have completed the present invention.

DISCLOSURE OF INVENTION

Namely the present invention relates to the thermosetting powder coating composition comprising a powder of composite resin which comprises a VdF polymer having crosslinkable functional group and a MMA polymer and has a melt flow rate (MFR) of 1 to 1,000 g/10 minutes when measuring at 130° C. at a load of 2.1 kg.

It is preferable that the above-mentioned composite resin powder is a powder pulverized at room temperature and having an average particle size of 1 to 100 μm.

It is further preferable that the MMA polymer also has crosslinkable functional group.

The present invention further relates to the thermosetting powder coating composition comprising the above-mentioned composite resin powder and a curing agent.

Particularly it is preferable that the crosslinkable functional group of the resin is at least one selected from carboxyl, hydroxyl and epoxy, and the curing agent has reaction sites having a reactivity with the respective crosslinkable functional groups.

Further the present invention relates to the coated article obtained by applying the above-mentioned thermosetting powder coating composition to a substrate and then baking for curing.

Preferred substrates are those having electric conductivity such as metal plates of stainless steel, aluminum, steel and galvanized steel, metal plates thereof subjected to chemical conversion treatment and resins endowed with electric conductivity by dispersing conductive carbon therein from the point that electrostatic coating can be carried out.

BEST MODE FOR CARRYING OUT THE INVENTION

In the thermosetting powder coating composition of the present invention, essential resin components thereof are a VdF polymer having crosslinkable functional group and MMA polymer.

The VdF polymer having crosslinkable functional group comprises a VdF unit, a unit having crosslinkable functional group and if necessary, a unit of other monomer copolymerizable therewith.

It is preferable that the VdF unit is contained in the VdF polymer in an amount of not less than 60% by mole, especially from 70 to 99% by mole based on the VdF polymer from the viewpoint of excellent compatibility with the MMA polymer.

Examples of the other copolymerizable monomer are, for instance, one or two of more of fluoroolefin monomers such as tetrafluoroethylene (TFE), trifluoroethylene (TrFE), chlorotrifluoroethylene (CTFE), hexafluoropropylene (HFP), monofluoroethylene (VF), and the like. Use of those comonomers can produce such excellent effects that melt kneading with MMA polymer, pigment and additives for coating can be conducted at relatively low temperature, melt-leveling of the powder coating occurs at relatively low temperature to give a coating film having good appearance, and cracking can be prevented at post-fabrication of a coated metal plate. Those effects cannot be obtained when only VdF unit is used. A content of those comonomer units is preferably from 0 to 40% by mole, especially from 1 to 30% by mole.

Examples of the crosslinkable functional group of VdF polymer are, for instance,

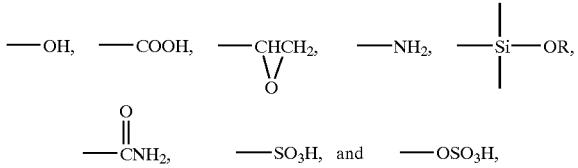

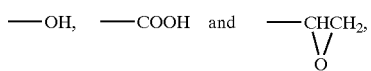

wherein R is alkyl having 1 to 3 carbon atoms.
Among those functional groups,

—OH,   —COOH  and   —CHCH$_2$
                       \\/
                        O are preferred.

Examples of the monomer being capable of introducing such crosslinkable functional group are, for instance, perfluorobutenoic acid (PFBA), fluorine-containing monomer having ether unit described in JP-A-8-67795 and non-fluorine-containing monomers having carboxylic acid group such as maleic anhydride (MAL), vinyl acetate (VA), undecylenic acid (UA) and allyloxypropionic acid; hydroxyl-containing monomers such as hydroxybutyl vinyl ether (HBVE) and allyl alcohol; epoxy-containing monomers such as glycidyl vinyl ether (GVE) and allyl glycidylether (AGE); allyl derivatives described in JP-A-6-279549; and the like.

Among them, from the viewpoint of reactivity in a baking temperature range in case of a combination with a known curing agent, PFBA, carboxyl-containing monomers such as maleic anhydride, hydroxyl-containing monomers such as HBVE and epoxy (glycidyl)-containing monomers such as GVE are preferred.

The crosslinkable functional group forms a curing site. An amount thereof varies depending on a reactivity of the functional group, kind of a curing agent and whether or not the crosslinkable functional group is introduced in the MMA polymer. When a composite resin is prepared in combination of the MMA polymer, the amount is not particularly limited as far as in the whole composite resin, an acid value is from 1 to 300 mgKOH/g, a hydroxyl value is from 1 to 200 mgKOH/g or an epoxy equivalent is in the range of from 5 to 15,000 equivalents. From the point that compatibility with the VdF polymer is lowered when too many functional groups are introduced, it is preferable to carry out the copolymerization so that the MMA unit is contained in an amount of not less than 70% by mole, more preferably not less than 80% by mole. For example, in case where the MMA polymer has no crosslinkable functional group, it is preferable that the crosslinkable functional groups are contained in the VdF polymer so that an acid value is from 1 to 300 mgKOH/g, a hydroxyl value is from 1 to 200 mgKOH/g or an epoxy equivalent is in the range of from 5 to 15,000 equivalents.

From the viewpoint mentioned above, an amount of a unit giving the crosslinkable functional group may be selected in the range of from 0.1 to 30% by mole, especially from 1 to 20% by mole based on the VdF polymer.

The VdF polymer having crosslinkable functional group can be prepared by copolymerizing each of the above-mentioned monomers (cf. JP-A-6-279549, JP-A-8-67795). The polymerization may be carried out by usual polymerization method such as emulsion polymerization, suspension polymerization or solution polymerization. Also a monomer having crosslinkable functional group may be grafted on the copolymer of VdF and other comonomer.

It is preferable that the VdF polymer having a crosslinkable functional group of the present invention has the following physical properties.

Number average molecular weight (Mn): Number average molecular weight is preferably from 1,000 to 100,000, especially 3,000 to 10,000 (molecular weight measured by GPC based on styrene) from the viewpoint of being excellent in pulverizability when preparing a powder coating, crack resistance of a coating film (at bending), post-processability, flowability at melting and compatibility with the MMA copolymer.

Melting point: Melting point is preferably not more than 150° C., especially 40° to 120° C. (measured with DSC) from the viewpoint of being excellent in leveling property even at relatively low baking temperature, giving a coating film having good appearance and having good compatibility with an acrylic resin and good property for kneading with a pigment and additives for coating.

Glass transition temperature (Tg): Tg is preferably not more than 150° C., especially 40° to 120° C. (measured with DSC) from the viewpoint of being excellent in leveling property even at relatively low baking temperature and giving a coating film having good appearance.

MFR: MFR is preferably from 1.0 to 1,000 g/10 min, especially from 5 to 100 g/10 min (2.1 kg of a load, 130° C.) from the viewpoint of being excellent in leveling property even at relatively low baking temperature and giving a coating film having good appearance.

The VdF polymer having crosslinkable functional group not only imparts excellent weather resistance, chemical resistance and stain removing property to the obtained coating film but also improves impact resistance and flexibility.

The MMA polymer which is another component of the composite resin of the present invention imparts excellent appearance such as gloss and lubricity, hardness and transparency at clear coating to the obtained coating film and further improves dispersibility of a pigment and adhesion to a substrate.

The MMA polymer usable in the present invention may be MMA homopolymer or a copolymer comprising MMA as an essential component and a monomer copolymerizable therewith. Examples of the copolymerizable monomer are, for instance, one or two or more of acrylate monomers and methacrylate monomers.

Examples of the acrylate monomers are, for instance, methyl acrylate, ethyl acrylate, propyl acrylate, n-butyl acrylate, isobutyl acrylate, t-butyl acrylate, n-hexyl acrylate, cyclohexyl acrylate, benzyl acrylate, lauryl acrylate, 2-ethylhexyl acrylate, and the like.

Examples of the methacrylate monomers are, for instance, ethyl methacrylate, propyl methacrylate, n-butyl methacrylate, isobutyl methacrylate, t-butyl methacrylate (t-BMA), n-hexyl methacrylate, cyclohexyl methacrylate, benzyl methacrylate, lauryl methacrylate, 2-ethylhexyl methacrylate, and the like.

Examples of the monomer copolymerizable with MMA other than those mentioned above are, for instance, conjugated diene compounds such as 1,3-butadiene, isoprene and chloroprene; aromatic vinyl compounds such as styrene, a-methylstyrene, halogenated styrene and divinyl benzene; vinyl cyanide compounds such as acrylonitrile and methacrylonitrile; and the like.

In the present invention, though the MMA polymer may not have crosslinkable functional group, the crosslinkable functional group mentioned in the description as to the VdF polymer may be introduced in the MMA polymer to make a crosslinkable MMA polymer.

Examples of the monomer having such crosslinkable functional group are, for instance, unsaturated carboxylic acids such as acrylic acid, methacrylic acid, maleic acid and crotonic acid as a carboxyl-containing monomer; 2-hydroxyethyl acrylate, hydroxyethyl acrylate, hydroxyethyl methacrylate, hydroxypropyl acrylate, hydroxypropyl methacrylate, ethylene glycol dimethacrylate, and the like as a hydroxyl-containing monomer; and glycidyl acrylate, glycidyl methacrylate (GMA), and the like as an epoxy-containing monomer.

A content of the MMA unit in the MMA polymer is not less than 70% by mole, preferably 90 to 100% by mole from the viewpoint of a good compatibility with the above-mentioned VdF polymer and from the point that a gloss of the obtained coating film is hard to be lowered.

In case where the above-mentioned monomer having crosslinkable functional group is copolymerized with the MMA polymer, an amount of the monomer unit is not particularly limited as far as in the whole composite resin prepared in combination of the VdF polymer, an acid value is from 1 to 300 mgKOH/g, a hydroxyl value is from 1 to 200 mgKOH/g or an epoxy equivalent is in the range of from 5 to 15,000 equivalents. From the point that compatibility with the VdF polymer is lowered when too many functional groups are introduced, it is preferable to carry out the copolymerization so that the MMA unit is contained in an amount of not less than 70% by mole, more preferably not less than 80% by mole. From the viewpoint mentioned above, a content of the monomer having functional group is from 0.1 to 30% by mole, preferably 1 to 20% by mole.

A glass transition temperature (Tg) of the MMA polymer is not limited particularly as far as it is from 30° to 120° C. when the MMA polymer is made into a composite resin in combination of VdF copolymer. It is preferable for the same reason as mentioned above that the copolymerization is carried out so that the MMA unit is contained in an amount of not less than 70% by mole, more preferably not less than 80% by mole.

A number average molecular weight of the MMA polymer is preferably from $1 \times 10^3$ to $1 \times 10^5$ from the point that post-processability is hard to be lowered and that an appearance of a coating film is hard to be lowered.

The above-mentioned MMA polymer can be obtained by usual method such as emulsion polymerization, suspension polymerization, solution polymerization or bulk polymerization.

A form of the above-mentioned VdF polymer and MMA polymer varies depending on the polymerization method. If necessary, they are formed into a powder having a size suitable for mixing.

For example, in case of emulsion polymerization or suspension polymerization, there is a method of after the polymerization, removing a polymerization solvent, washing and then drying to give a powder or further pulverizing. Also there is a method of after the polymerization, carrying out spray-drying for drying and granulation. In case of the above-mentioned emulsion polymerization, it is possible to adopt a method of adding an organic solvent to the obtained aqueous dispersion, stirring for granulation and then drying a granulate.

Also in case of the solution polymerization, there is a method of evaporating the obtained solution to dryness and then pulverizing or a method of dispersing the solution in a poor solvent of the copolymer, recovering a precipitated copolymer, drying and then pulverizing.

In case of the bulk polymerization, there is a method of pulverizing an obtained copolymer in the form of bulk.

The composite resin of the present invention can be obtained, for example, by usual method of mixing the so-prepared VdF polymer and MMA polymer, for example, by dry blending method and then melt-kneading. At the dry blending, it is preferable to mix the VdF polymer and MMA polymer in the form of pellet or powder. It is further preferable to carry out dry blending in the particle size of 1 to 100 μm and then melt-kneading in a temperature range of 80° to 200° C., preferably 100° to 150° C. It is preferable that when melt-kneaded uniformly, the composite resin is in a state that both polymers are compatible with each other and appearance of the resin is transparent, and from the viewpoint of heat resistance, weather resistance and chemical resistance, it is more preferable that the both polymers become compatible with each other at a molecular level thermodynamically or viscoelastically. An equipment to be used at that time is preferably a single screw or two screw kneader equipped with a heating device. More preferred equipment is one which can carry out mixing, melting and kneading continuously. Further an equipment which has a function of melt-extruding for pelletizing after the melt-kneading is suitable from the viewpoint of workability.

Also there is a method of blending the VdF polymer and MMA polymer obtained in the form of an organic solution by solution polymerization, evaporating the obtained solution to dryness and then pulverizing or a method of dispersing the solution in a poor solvent of copolymer, recovering a precipitated copolymer, drying and then pulverizing.

Example of the other method is, for instance, a method of mixing an aqueous dispersion of VdF polymer and an aqueous dispersion of MMA polymer which are obtained by the above-mentioned emulsion polymerization or suspension polymerization, followed by coagulating, drying and melt-kneading.

Further there is a method of seed-polymerizing a monomer mixture of MMA and monomer copolymerizable therewith in an aqueous dispersion containing particles of VdF polymer having crosslinkable functional group. The aqueous dispersion obtained by the seed-polymerization is subjected to, for example, spray-drying or coagulating, washing and drying. An obtained powder may be used as it is in the form of powder or may be pulverized if necessary.

With respect to a mixing ratio of the VdF polymer and MMA polymer, an amount of the MMA polymer is from 10 to 400 parts (part by weight, hereinafter the same), preferably 20 to 250 parts on the basis of 100 parts of VdF polymer. With such a mixing ratio, an effect of improvement in adhesion to a substrate and flexibility of the obtained powder coating composition and gloss, weather resistance, water resistance and chemical resistance of a coating film obtained from the composition is increased.

In the composite resin of the present invention, MFR measured at 130° C. at a load of 2.1 kg is from 1 to 1,000 g/10 min, preferably 5 to 100 g/10 min. When MFR is lower than 1 g/10 min, melt-kneading property with a pigment, leveling agent and additives for a coating composition is lowered and pulverizability becomes poor. As a result of lowering of melt-leveling property at making a coating film, there arises a problem such as lowering of appearance of the coating film. When MFR exceeds 1,000 g/10 min, there arises a problem such as lowering of appearance of the coating film due to dripping at melt-leveling for making a coating film. In both cases, the composite resin composition is not suitable as a powder coating.

As mentioned above, a resin for powder coating which is hard and fragile at room temperature (0 to about 40° C.) can be finely pulverized at room temperature, but one which has Tg around room temperature has elasticity and cannot be finely pulverized at room temperature and therefore is solidified at a very low temperature (from about −150° C. to about −50° C.) and then pulverized. However since a conventional VdF resin which can be finely pulverized at room temperature must be hard and fragile around room temperature as mentioned above, the obtained coating film is inferior in crack resistance at bending and impact resistance.

One of the features of the present invention is such that the composite resin can be finely pulverized at room temperature and besides crack resistance at bending of the obtained dry coating film and impact resistance thereof are improved.

Finely pulverizing methods to be suitably adopted in the present invention are, for example, impact pulverizing method, and the like. Examples of preferred equipment therefor are a hammer mill, and the like.

With respect to other features of the composite resin of the present invention or its powder, the resin or its powder having the following characteristics is preferred.

Tg: Preferred Tg is from 30° to 100° C., especially 500 to 70° C. from the viewpoint of pulverizability around room temperature, hardness of a coating film at a temperature during use and formation of a film by heat-melting. Apparent specific gravity: An apparent specific gravity is preferably from 0.1 to 1.0 g/cc, especially 0.2 to 0.7 g/cc from the viewpoint of miscibility with a pigment and additives for a coating at dry blending.

It is preferable that the composite resin to be used in the present invention is crosslinked with a curing agent at baking.

A curing agent to be used may be optionally selected depending on kind of the above-mentioned crosslinkable functional group, a speed of crosslinking reaction, a melt-kneading temperature of a pigment and additives, a film-forming temperature by heat-melting, etc. In case of a conventional thermosetting powder coating composition containing VdF polymer, selection of a curing agent was difficult from the viewpoint of compatibility with the polymer, and therefore kind of usable curing agent, especially a combination thereof with a resin was limited. According to the present invention, since crosslinkable functional group is introduced in the VdF polymer of the composite resin, kind and combination of a usable curing agent can be extended.

Examples of the curing agent are, for instance, epoxy or glycidyl compounds such as alicyclic epoxy resin, GMA acryl, aliphatic oxysilane, triglycidyl isocyanurate (TGIC), diglycidyl terephthalate, diglycidyl p-hydroxybenzoate, spiroglycol diglycidylether and hydantoin compounds; isophorone diisocyanate, tolylene diisocyanate, xylilene diisocyanate, 4,4'-diphenylmethane diisocyanate, hexamethylene diisocyanate, dimers thereof and blocked isocyanates obtained by blocking an isocyanate group of alcohol-modified polyisocyanate with a blocking agent (for example, ε-caprolactam, phenol, benzyl alcohol, methyl ethyl ketone oxime, etc.); curing agent of polybasic acid such as β-hydroxyalkylamide; polycarboxylic acids, e.g. aliphatic dibasic acids such as fumaric acid, succinic acid, adipic acid, azelaic acid, sebacic acid and dodecanedioic acid (DDA) and acid anhydrides such as phthalic anhydride, trimellitic anhydride and pyromellitic anhydride; tetramethoxymethylglycoluryl, isocyanate-modified silane coupling agent, and other curing agents described in JP-B-6-104792, JP-A-7-188587 and JP-A-1-103670. Thus a wide range of curing agents can be used.

Among them, preferred combinations of a curing agent with crosslinkable functional group in the composite resin particularly from the viewpoint of compatibility therewith are as follows.

(1) Crosslinkable functional group: Hydroxyl group
    Curing agent: Blocked isocyanate, polyurethodione
(2) Crosslinkable functional group: Carboxyl group
    Curing agent: Triglycidyl isocyanurate, β-hydroxyalkylamide, GMA acryl
(3) Crosslinkable functional group: Glycidyl group
    Curing agent: Aliphatic dibasic acids It is preferable that an amount of the curing agent is from 0.1 to 1.2 equivalents, especially 0.5 to 1.0 equivalent to an amount of functional group contained in the composite resin. When less than 0.1 equivalent, an effect of improvement by crosslinking in crack resistance at bending and impact resistance is not sufficient and water resistance is also lowered. When more than 1.2 equivalents, it results in lowering of appearance of a coating film.

In addition to the curing agent, a curing catalyst may be blended. Examples of the curing catalyst are, for instance, quaternary ammonium salts such as tetrabutylammonium chloride, tetrabutylammonium bromide and tetrabutylammonium iodide; quaternary phosphonium salts such as ethyltriphenylphosphonium acetate; phosphines such as triphenylphosphine; imidazoles such as 2-methylimidazole; organotin compounds such as dibutyltindilaurate and stannous octanoate; methyltolylsulfoneimide and stannous imethanesulfonate, and the like. The curing catalyst may be blended in an amount of from about 0.1 part to about 3 parts to 100 parts of the composite resin.

In addition to those additives, to the powder coating composition of the present invention may be blended various additives usually added in the field of paints, in an amount not lowering an effect of the present invention. Examples of such other additives are a pigment, extended pigment, flow control agent, antioxidant, thermal deterioration preventing agent, ultraviolet ray absorber, foaming inhibiting agent, flatting control agent, defoaming agent, electric charge control agent, antistatic agent, and the like.

Since a coating film formed with the composite resin of the present invention is transparent, various kinds of pigments can be used. For example, there are organic pigments such as condensed azo compounds, isoindolinone, quinacridone, diketopyrrolopyrrole, anthraquinone, dioxazine and various organometal complexes; inorganic pigments such as titanium oxide (Preferred are one having rutile-type structure, and further preferable are alumina-treated, silica-treated or zirconia-treated titanium oxides), red iron oxide, yellow iron oxide, black iron oxide, carbon, chromium oxide, lead chromate, white lead and molybdenum orange; metal powders such as aluminum powder and stainless steel powder; and the like. Among them, inorganic pigments are preferred from the viewpoint of weather resistance which is one of the features of the present invention, particularly to maintain a gloss retention and to inhibit fading of color. A preferred content of the pigment is not more than 80 parts on the basis of 100 parts of the resin.

Examples of the extended pigment are, for instance, talc, silica, calcium carbonate, barium sulfate, mica, diatomaceous silica, asbestos, basic silicate, and the like.

Examples of the flow control agent are, for instance, acrylate polymers such as polylauryl acrylate, polybutyl acrylate and poly-2-ethylhexyl acrylate; ester of polyethylene glycol and perfluorocarboxylic acid and fluorine-containing polymers having a low melting point such as VdF/TFE/HFP copolymer (excluding VdF polymers having crosslinkable functional group); silicone polymers such as polydimethylsiloxane and polymethylphenylsiloxane; and the like.

Then the process for preparing the powder coating composition of the present invention is explained below. One of the features of the composition of the present invention is such that a conventional preparation process of powder coating composition including a pulverizing step at room temperature can be used as it is.

The preparation process comprises the basic steps such as a pre-pulverizing step, dry blending step, melt-kneading step, pulverizing step and classifying step.

(Pre-pulverizing step)

As mentioned above, the VdF polymer having crosslinkable functional group and MMA polymer are obtained in various forms such as pellet, seed polymer powder, bulk and pulverized polymer. In order to obtain good mixing in the following dry blending step, the polymers are formed into pellets of not more than 5 mm or pulverized into an average particle size of about 50 $\mu$m to about 100 $\mu$m. In that case, the VdF polymer having crosslinkable functional group and MMA polymer may be previously melt-mixed and the melt-mixed composite copolymer may be pulverized. With respect to each polymer to be used in the present invention, the pre-pulverizing can be carried out at room temperature.

(Dry blending step)

The fluorine-containing copolymer having a crosslinkable functional group in the form of powder or pellet, curing agent, curing catalyst and the above-mentioned additives such as a pigment are dry-blended. A mixer to be used is usually a high speed mixer, low speed mixer or Henschel mixer. If a temperature inside the mixer is elevated too high, a reaction of the crosslinkable functional group with the curing agent advances. Therefore it is preferable that the temperature inside the mixer is maintained at a temperature of about 80° C. or lower by controlling time and mixer temperature.

(Melt-kneading step)

The above-mentioned dry-blended product is put in a melt-kneader, melted at a temperature of not less than a melting point or Tg of the composite resin to knead sufficiently, and then extruded in the form of sheet. In that case, an extruder which is high in productivity in continuous production is used preferably. Examples of usual melt-kneader are a single screw extruding kneader, two screw extruding kneader, heating kneader and heating roll. A melt-kneading temperature and time are 80° to 120° C. and several tens of seconds, respectively so that the reaction of the functional group in the resin and the curing agent does not advance too much.

(Pulverizing step)

The melt-extruded sheet is roughly pulverized and then finely pulverized. The sheet melt-extruded in a specified form is, after cooling and solidifying, roughly pulverized into chips of about 5 mm to about 15 mm and then finely pulverized at room temperature. In that case, it is preferable that the pulverizer is maintained at a constant temperature with air-cooling or water-cooling means. The temperature is maintained preferably in the range of from about 5° C. to about 40° C. As the pulverizer, a high speed impact pulverizer, high speed pin type pulverizer, or the like is used preferably.

(Classifying step)

The finely pulverized powder is classified with a centrifugal classifier, blower type sieving machine, sieve shaking machine, or the like. A narrow particle size distribution is preferable. It is preferable that an average particle size of the powder coating composition is from 1 to 100 $\mu$m, especially 10 to 50 $\mu$m. When less than 1 $\mu$m, it is difficult to control a coating thickness because the particles are subject to electrostatic repulsion, and there occur problems with lowering of a coating efficiency due to lowering of collecting efficiency with a cyclone in case of recycling and also lowering of safety workability due to permeation through a protection mask. When more than 100 $\mu$m, leveling property is lowered, thereby causing problems that appearance of a coating film becomes poor and coating thin cannot be carried out. An average particle size is determined by a desired coating thickness. For example, in case of a coating thickness of about 40 $\mu$m to about 50 $\mu$m, the average particle size is preferably 25 to 30 $\mu$m. The smaller the average particle size is, the more the appearance of coating film is enhanced, and coating thin is possible, but a blockage occurs at spray-coating, thereby causing lowering of workability and adhesion of a coating.

The thermosetting powder coating composition of the present invention can be prepared in such a manner mentioned above. The VdF polymer having crosslinkable functional group and MMA polymer may be subjected to dry blending after previously melt-mixed into a pellet or powder.

The thermosetting powder coating composition of the present invention can be coated on various substrates by known applying methods. Then the coating film obtained by baking the coated film is excellent in appearance such as smoothness and gloss, mechanical properties such as surface hardness, flexibility and impact resistance, adhesion to a substrate, weather resistance, stain-proofing property and water resistance.

Namely the present invention relates to the coated article obtained by coating the above-mentioned thermosetting powder coating composition on a substrate and then baking it for curing.

For coating, known coating methods can be employed. For example, there are electrostatic powder spray coating method, fluid bed coating method, electrostatic dip coating method, and the like. A coating thickness is usually in the range of from 20 to 100 $\mu$m.

Then the coating film is baked. A baking temperature is not more than 200° C., usually not less than 150° C., preferably 160° to 200° C. A baking time is from 10 to 30 minutes, usually 15 to 20 minutes. At that baking temperature, the powder coating composition of the present invention exhibits excellent flowability and gives a smooth and uniform baked coating film.

The powder coating composition of the present invention is also excellent in adhesion to a substrate. The preferable substrate is one which has electric conductivity. Examples thereof are, for instance, various metal plates such as stainless steel plate, aluminum plate, steel plate and galvanized steel plate, and in addition, heat resistant engineering plastics such as polycarbonate, polyphenylene oxide, polyethylene terephthalate, polyether sulfone, polyamideimide and polyether ether ketone which are endowed with electric conductivity by dispersing a conductive carbon. It is preferable that those substrates are subjected to removal of rust by sand blasting or acid washing, baking, degreasing by washing with a solvent, with emulsion type cleaner or alkali, phosphating with zinc phosphate, calcium phosphate or iron phosphate, or chemical conversion treatment such as chromate treatment, alumite treatment or chromium phosphate treatment. In that case, though the coating composition of the present invention has enough adhesion to those substrates, in compliance with purpose, it is possible to carry out intermediate coating of zinc rich rust-preventive primer or various primers such as an epoxy resin and acrylic resin together. Those intermediate coatings may be applied in any form of solvent type coating, aqueous coating, powder coating or the like. It is preferable to apply in the form of powder coating in consideration of workability in the present invention.

The coated article of the present invention is used for various applications. Non-restricted examples of the application are, for instance, applications described in "Handbook of Powder Coating Technique" edited by Nippon Funtai Toso Kogyo Kyokai (1994), pp 169 to 173 such as construction and building material, communication device, vehicles, road materials, water and gas service materials, metal products, domestic appliances, machines, tools, measuring instruments, medical instruments, utensils for maintenance, agricultural materials, ships, sports and leisure products, and the like.

Then the present invention is explained by means of examples, but is not limited to them.

PREPARATION EXAMPLE 1

A 1-liter pressure resistant reactor equipped with a stirrer was charged with 250 ml of deionized water, and feeding of pressurized nitrogen and deairing were repeated to remove dissolved oxygen. Then the reactor was charged with 196 g of chlorofluoroethane (HCFC-141 b) and 13.8 g of perfluorobutenoic acid (PFBA) successively. A pressure inside the reactor was increased up to 10 kg/cm$^2$ at 45° C. with a monomer mixture of VdF/TFE in a % by mole ratio of 78/22. Then the reactor was charged with 4.9 g of ethyl acetate (EtOAc) and 2.5 g of 40% tetrafluoropropanol solution of diisopropylperoxycarbonate (IPP), and the above-mentioned monomer mixture was supplied continuously so that the inside pressure became constant at 10 kg/cm$^2$. After 5.6 hour reaction, the inside of the reactor was restored to normal temperature and normal pressure to terminate the reaction. After the obtained solid was washed and dehydrated, it was vacuum-dried at 80° C. to give 75 g of carboxyl-containing VdF polymer. A melting point, glass transition temperature (Tg) and number average molecular weight (Mn) of the obtained VdF polymer were measured by the methods mentioned below. Melting point, glass transition temperature: A heat balance of 10 mg of VdF polymer was measured at a heat-up speed of 10° C./min in a temperature range of −25° C. to 200° C. by using Thermal Analysis System (available from Perkin Elmer Co., Ltd.), and a top peak was assumed to be a melting point. Since the glass transition temperature (Tg) was detected as two variable polar points, it was obtained by a center point method. Number average molecular weight: A styrene-based molecular weight was measured by using 0.5% by weight VdF copolymer in THF solution and passing through Column TSKgel G4000XL (available from Toso Kabushiki Kaisha) at a flow rate of carrier (THF) of 1.0 ml/min.

The results are shown in Table 1.

PREPARATION EXAMPLES 2 to 7 and COMPARATIVE PREPARATION EXAMPLES 1 to 2

Polymerization was carried out in the same manner as in Preparation Example 1 except that monomer components, amount of ethyl acetate and polymerization time were changed as shown in Table 1. The same measurements as in Preparation Example 1 were carried out with respect to the obtained VdF polymer. The results are shown in Table 1.

TABLE 1

| VdF polymer | Prep. Ex. | | | | | | | Com. Prep. Ex. | |
|---|---|---|---|---|---|---|---|---|---|
| | 1 | 2 | 3 | 4 | 5 | 6 | 7 | 1 | 2 |
| Monomer components (% by mole) | | | | | | | | | |
| VdF | 80 | 78 | 80 | 80 | 78 | 78 | 78 | 77 | 96 |
| TFE | 17 | 16 | 12 | 17 | 19 | 19 | 17 | 17 | — |
| HFP | — | 3 | — | — | — | — | — | 6 | 4 |
| PFBA | 3 | — | — | 3 | — | — | — | — | — |
| VA | — | — | — | — | 3 | — | — | — | — |
| UA | — | — | — | — | — | 3 | — | — | — |
| HBVE | — | 3 | — | — | — | — | — | — | — |
| GVE | — | — | 8 | — | — | — | — | — | — |
| AGE | — | — | — | — | — | — | 5 | — | — |
| Ethyl acetate (g) | 4.9 | 4.9 | 4.9 | 10 | 3 | 3 | 5 | 4.9 | 0.5 |
| Polymerization time (hr) | 5.6 | 5 | 6.7 | 10 | 7 | 10 | 8 | 4.5 | 4.2 |
| Obtained weight (g) | 75 | 86 | 92 | 56 | 90 | 102 | 60 | 71 | 90 |

TABLE 1-continued

|  | Prep. Ex. | | | | | | | Com. Prep. Ex. | |
|---|---|---|---|---|---|---|---|---|---|
| VdF polymer | 1 | 2 | 3 | 4 | 5 | 6 | 7 | 1 | 2 |
| Melting point (° C.) | 101 | 110 | 104 | 96 | 120 | 113 | 112 | 91 | 123 |
| Glass transifion temperature (° C.) | −4 | 5 | 10 | −3 | −3 | 0 | 2 | 2 | −16 |
| Number average molecular weight | 9300 | 10000 | 5900 | 3200 | 10000 | 5400 | 9000 | 14000 | 120000 |

Abbreviations in Table 1 represent the following compounds.
VdF: Vinylidene fluoride
TFE: Tetrafluoroethylene
HFP: Hexafluoropropylene
PFBA: Perfluorobutenoic acid
VA: Vinyl acetate
UA: Undecylenic acid
HBVE: Hydroxybutyl vinyl ether
GVE: Glycidyl vinyl ether
AGE: Allyl glycidyl ether

COMPARATIVE PREPARATION EXAMPLE 3

A 1-liter pressure resistant reactor was charged with 523 g of t-butanol, 53 g of cyclohexyl vinyl ether, 30 g of isobutyl vinyl ether, 83 g of hydroxybutyl vinyl ether, 3.3 g of potassium carbonate and 0.23 g of azobisisobutylonitrile, followed by solidifying with liquid nitrogen and deairing to remove dissolved oxygen. After that, 167 g of CTFE was introduced under pressure and the reactor was heated up to carry out a reaction at 65° C. for 10 hours. After cooling, a residual monomer was distilled off and a solution was collected. Then a dispersion medium was distilled off at 60° C. under reduced pressure and pulverizing of the obtained resin at room temperature was tried by using Micro Hammer Mill. However melting and fusing of the resin occurred and no powder was obtained.

PREPARATION EXAMPLE 8

A 1-liter four-necked flask equipped with a stirring blade, cooling tube and thermometer was charged with 300 ml of methanol, 60 g of acrylic acid (AAc) and 1.2 g of n-lauryl mercaptan. When a temperature of a mixture reached 60° C. in nitrogen stream in a warm bath and 2.5 ml of 40% aqueous toluene solution of IPP was added, generation of heat arose and refluxing of methanol started. Subsequently a mixture of 140 g of methyl methacrylate (MMA) and 2.8 g of n-lauryl mercaptan was added dropwise over one hour. With advance of polymerization, precipitation of polymerization product occurred in the form of white particle. Two hours after starting of the reaction, a reaction system was cooled and a product in the system was dispersed in water to give an aqueous dispersion. A solid content of the obtained aqueous dispersion was collected by filtrating through a glass filter and after washing and dehydrating, vacuum-dried at 80° C. to give 192 g of MMA polymer (white powder).

A glass transition temperature (Tg) and number average molecular weight (Mn) of the obtained MMA copolymer were measured by the above-mentioned methods.

The results are shown in Table 2.

PREPARATION EXAMPLES 9 to 11

MMA polymer was prepared in the same manner as in Preparation Example 8 except that monomer components were changed as shown in Table 2. A glass transition temperature and number average molecular weight are shown in Table 2.

TABLE 2

|  | Preparation Example | | | |
|---|---|---|---|---|
| MMA polymer | 8 | 9 | 10 | 11 |
| Monomer components (% by mole) | | | | |
| MMA | 85 | 85 | 70 | 50 |
| EA | — | — | — | 20 |
| t-BMA | 5 | — | — | — |
| AAc | 10 | — | — | — |
| HEMA | — | 15 | — | — |
| GMA | — | — | 30 | 30 |
| Glass transition temperature (° C.) | 100 | 91 | 84 | 67 |
| Number average molecular weight | 7300 | 8200 | 7600 | 5200 |

Abbreviations in Table 2 represent the following monomers.
MMA: Methyl methacrylate
EA: Ethyl acrylate
t-BMA: t-Butyl methacrylate
AAc: Acrylic acid
HEMA: 2-Hydroxyethyl methacrylate
GMA: Glycidyl methacrylate

EXAMPLE 1

60 Gram of VdF polymer having crosslinkable functional group and synthesized in Preparation Example 1 and 40 g of MMA polymer prepared in Preparation Example 5 were melt-kneaded at 160° C. for five minutes with Buss Co-kneader (available from Buss Co., Ltd.), followed by forming into a sheet and then pelletizing to give composite resin pellets. MFR of the composite resin pellets at 130° C. at a load of 2.1 kg was 42.3 g/10 min.

Then the composite resin pellets were pulverized at room temperature (20° C.) for five minutes with Micro Hammer Mill (available from IKA Co., Ltd.) to evaluate workability at pulverizing. The evaluation was carried out under the following criteria with respect to the obtained powder.

A: An amount of powder having passed through 200 mesh screen is not less than 80% by weight.
B: An amount of powder having passed through 200 mesh screen is not less than 50% by weight and less than 80% by weight.
C: An amount of powder having passed through 200 mesh screen is less than 50% by weight.

Further in order to evaluate compatibility of the composite resin with a curing agent, 5 g of a curing agent, i.e.

triglycidyl isocyanurate (TGIC available from Rhom & Haas Co., Ltd.), blocked isocyanate (B-NCO, BESTAGON B1530 available from Huls Co., Ltd.) or dodecyldioic acid (DDA available from Wako Jyunyaku Kogyo Kabushiki Kaisha) was dry-blended with 60 g of VdF polymer having crosslinkable functional group of Preparation Example 1 and 40 g of MMA polymer of Preparation Example 5 at 25° C. for 15 minutes by using Henschel mixer (FM75 available from Kabushiki Kaisha Mitsui Miike Seisakusho), followed by melt-kneading at 100° C. for 15 seconds with Buss Co-kneader, extruding into a sheet and then pelletizing. Compatibility of the curing agent was evaluated by the following method.

(Method of evaluation)

The obtained pellets were formed into a 1 mm thick sheet at 200° C. by a heat press, and transmissivity of 630 nm light through the sheet was measured. The compatibility of the curing agent was evaluated by transparency as follows.

A: Transmissivity is not less than 80%. Evaluated as compatibility is good.
B: Transmissivity is not less than 50% and less than 80%. Evaluated as compatibility is at medium level.
C: Ttransmissivity is less than 50%. Evaluated as there is no compatibility.

EXAMPLES 2 to 8 and COMPARATIVE EXAMPLES 1 to 4

MFR, workability at pulverizing and compatibility of a curing agent were evaluated in the same manner as in Example 1 except that VdF polymers and MMA polymers of Preparation Examples shown in Table 3 were used. The results are shown in Table 3.

EXAMPLE 9

A uniform mixture was obtained by dry-blending 60 g of VdF polymer having crosslinkable functional group and prepared in Preparation Example 1, 40 g of MMA polymer prepared in Preparation Example 5, 3 g of triglycidyl isocyanurate, 15 g of titanium oxide, 0.5 g of flowability control agent (MODAFLOW available from Monsanto Chemical Co., Ltd.) and 0.5 g of benzoin at 25° C. for 15 minutes with Henschel mixer. The mixture was melt-kneaded at 100° C. for one minute with Buss Co-kneader, extruded into a sheet and then pelletized. Then 20 g of the pellets was pulverized at room temperature (about 20° C.) for five minutes with Micro Hammer Mill. The obtained powder was passed through a 200 mesh screen for classification to give a powder coating composition having an average particle size of 50 μm.

EXAMPLES 10 to 17 and COMPARATIVE EXAMPLE 5

A powder coating composition was obtained in the same manner as in Example 9 except that VdF polymer, MMA polymer and curing agent were changed as shown in Table 4.

TABLE 3

|  | Example |  |  |  |  |  |  |  | Comparative Example |  |  |  |
|---|---|---|---|---|---|---|---|---|---|---|---|---|
|  | 1 | 2 | 3 | 4 | 5 | 6 | 7 | 8 | 1 | 2 | 3 | 4 |
| VdF polymer (g) | Prep. Ex. 1 (60) | Prep. Ex. 1 (60) | Prep. Ex. 2 (60) | Prep. Ex. 3 (60) | Prep. Ex. 4 (60) | Prep. Ex. 5 (60) | Prep. Ex. 6 (60) | Prep. Ex. 7 (60) | Com. Prep. Ex. 1 (60) | Com. Prep. Ex. 1 (60) | Com. Prep. Ex. 1 (60) | Com. Prep. Ex. 2 (60) |
| MMA polymer (g) | Prep. Ex. 8 (40) | Prep. Ex. 10 (40) | Prep. Ex. 9 (40) | Prep. Ex. 11 (40) | Prep. Ex. 11 (40) | Prep. Ex. 8 (40) | Prep. Ex. 8 (40) | Prep. Ex. 10 (40) | Prep. Ex. 8 (40) | Prep. Ex. 9 (40) | Prep. Ex. 10 (40) | Prep. Ex. 8 (40) |
| MFR (g/10 min) | 42.3 | 48.8 | 56.7 | 89.1 | 720 | 43 | 85 | 42.5 | 42.2 | 39.8 | 44.4 | 0.7 |
| Workability at pulverizing | A | A | A | A | A | A | A | A | A | A | A | C |
| Compatibility of curing agent |  |  |  |  |  |  |  |  |  |  |  |  |
| TGIC | A | A | A | A | A | A | A | A | B | — | — | C |
| B-NCO | A | A | A | A | A | A | A | A | B | B | B | B |
| DDA | — | A | A | A | A | — | — | A | — | — | C | — |

TABLE 4

|  | Example |  |  |  |  |  |  |  |  | Com. |
|---|---|---|---|---|---|---|---|---|---|---|
|  | 9 | 10 | 11 | 12 | 13 | 14 | 15 | 16 | 17 | Ex. 5 |
| VdF polymer (g) | Prep. Ex. 1 (60) | Prep. Ex. 2 (70) | Prep. Ex. 3 (60) | Prep. Ex. 1 (90) | Prep. Ex. 3 (10) | Prep. Ex. 4 (60) | Prep. Ex. 5 (60) | Prep. Ex. 6 (60) | Prep. Ex. 7 (60) | Prep. Ex. 1 (100) |
| MMA polymer (g) | Prep. Ex. 8 | Prep. Ex. 9 | Prep. Ex. 10 | Prep. Ex. 8 | Prep. Ex. 11 | Prep. Ex. 11 | Prep. Ex. 8 | Prep. Ex. 8 | Prep. Ex. 10 | — |

TABLE 4-continued

|  | Example | | | | | | | | | Com. Ex. 5 |
|---|---|---|---|---|---|---|---|---|---|---|
|  | 9 | 10 | 11 | 12 | 13 | 14 | 15 | 16 | 17 |  |
| Curing agent (g) | (40)<br>TGIC<br>(3) | (30)<br>B-NCO<br>(5) | (40)<br>DDA<br>(7) | (10)<br>TGIC<br>(2) | (90)<br>DDA<br>(17) | (40)<br>DDA<br>(35) | (40)<br>TGIC<br>(6) | (40)<br>TGIC<br>(6) | (40)<br>DDA<br>(7) | TGIC<br>(0.5) |

EXAMPLES 18 to 26 and COMPARATIVE EXAMPLE 6

The powder coating compositions shown in Table 5 were coated on a 0.3 mm thick aluminum plate of JIS2003 A714 subjected to chemical conversion treatment at an applied voltage of 60 kV by using a corona discharge type powder coating gun (GX3300 available from Onoda Cement Kabushiki Kaisha), and then immediately baking was carried out at 180° C. for 20 minutes to give a coated article.

The following characteristics of the obtained coated article were determined. The results are shown in Table 5.
(Coating thickness)
Coating thickness is measured with an eddy-current instrument EL10D for measuring a coating thickness (available from Kabushiki Kaisha Sanko Denshi Kenkyusho).
(Appearance of coating film)
Fluorescent light is emitted to the coated article and a shape of the light reflected on the surface of the coating film is evaluated with naked eyes.

A cross cut test for adhesion is carried out according to AAMA605.
(Boiling water resistance)
After a test of dipping in boiling water according to AAMA605, adhesion is evaluated.
(Stain-proofing property)
An oily ink (red) is applied to the coated plate, and after allowed to stand at room temperature for 24 hours, is wiped off with a cloth impregnated with ethanol. Stain-proofness is evaluated with a color difference $\Delta E$ before and after the test under the following criteria.
A: $\Delta E$ is less than 1.
B: $\Delta E$ is not less than 1 and less than 5.
C: $\Delta E$ is not less than 5.
(Weather resistance)
A gloss retention ratio is measured after a lapse of 2,000 hours by using an accelerated weather resistance tester (sunshine weather-o-meter).

TABLE 5

|  | Example | | | | | | | | | Com. Ex. 6 |
|---|---|---|---|---|---|---|---|---|---|---|
|  | 18 | 19 | 20 | 21 | 22 | 23 | 24 | 25 | 26 |  |
| Powder coating composition used | Ex. 9 | Ex. 10 | Ex. 11 | Ex. 12 | Ex. 13 | Ex. 14 | Ex. 15 | Ex. 16 | Ex. 17 | Com. Ex. 5 |
| Coating thickness (μm) | 40 | 40 | 40 | 40 | 40 | 40 | 40 | 40 | 40 | 40 |
| Appearance of coating film | A | A | A | A | A | A | A | A | A | A |
| Gloss | 72 | 74 | 68 | 61 | 76 | 73 | 72 | 71 | 72 | 38 |
| Pencil hardness | 2H | F | 2H | HB | H | 2H | H | H | H | B |
| Impact resistance | ○ | ○ | ○ | ○ | ○ | ○ | ○ | ○ | ○ | ○ |
| Flexibility | 1T | 1T | 1T | 1T | 1T | 2T | 1T | 1T | 2T | 1T |
| Adhesion | 100/100 | 100/100 | 100/100 | 100/100 | 100/100 | 100/100 | 100/100 | 100/100 | 100/100 | 75/100 |
| Boiling water resistance | 100/100 | 100/100 | 100/100 | 100/100 | 100/100 | 100/100 | 100/100 | 100/100 | 100/100 | 25/100* |
| Stain-proofing property | A | A | A | A | A | A | A | A | A | A |
| Weather resistance | 98 | 98 | 97 | 101 | 78 | 69 | 89 | 88 | 85 | 97 |

*A gloss was lowered.

A: There is no deformation on the shape of light.
B: There is a deformation slightly on the shape of light.
C: There is a deformation greatly on the shape of light.
(Gloss)
A specular gloss at an angle of 60 degrees is measured according to JIS K 5400-6.7.
(Pencil hardness)
A pencil hardness is measured according to JIS K 5400.
(Impact resistance)
After carrying out a falling ball impact test according to AAMA605, peeling test is conducted and impact resistance is evaluated under the following criteria.
○: There is neither cracking nor peeling on the coating film.
x: Cracking and peeling are found on the coating film.
(Flexibility)
A bending test is carried out according to AAMA605.
(Adhesion)

INDUSTRIAL APPLICABILITY

The thermosetting powder coating composition of the present invention prepared by using a composite resin which can be pulverized at room temperature and has excellent compatibility with various curing agents can make preparation of a powder coating easy and give a coated article having a coating film being excellent in physical properties.

What is claimed is:
1. A process for preparing a thermosetting powder coating composition comprising a powder having an average particle size of 1 to 100 μm, which comprises dry-blending a composite resin comprising a vinylidene fluoride polymer having a crosslinkable functional group and a methyl methacrylate polymer with a curing agent, said composite resin having a melt flow rate of 1 to 1,000 g/10 minutes when measuring at 130° C. at a load of 2.1 kg, and then pulverizing while maintaining the pulverizing system at 5 to 45° C. with cooling.

2. The process of claim 1, wherein said methyl methacrylate polymer has crosslinkable functional group.

3. The process of claim 1, wherein the crosslinkable functional group is at least one selected from carboxyl, hydroxyl or epoxy and the curing agent has a structure having a reaction site being reactive with the respective crosslinkable functional groups.

4. The process of claim 2, wherein the crosslinkable functional group is at least one selected from carboxyl, hydroxyl or epoxy and the curing agent has a structure having a reaction site being reactive with the respective crosslinkable functional groups.

5. A thermosetting powder coating composition comprising a powder having an average particle size of 1 to 100 µm, prepared by, dry-blending a composite resin including a vinylidene fluoride polymer having a crosslinkable functional group and a methyl methacrylate polymer with a curing agent, said composite resin having a melt flow rate of 1 to 1,000 g/10 minutes when measuring at 130° C. at a load of 2.1 kg, and then pulverizing while maintaining the pulverizing system at 5 to 45° C. with cooling.

6. The thermosetting powder coating composition of claim 5, wherein said methacrylate polymer has a crosslinkable functional group.

7. The thermosetting powder coating composition of claim 5, wherein the crosslinkable functional group is at least one selected from carboxyl, hydroxyl or epoxy and the curing agent has a structure having a reaction site being reactive with the respective crosslinkable functional groups.

8. The thermosetting powder coating composition of claim 6, wherein the crosslinkable functional group is at least one selected from carboxyl, hydroxyl or epoxy and the curing agent has a structure having a reaction site being reactive with the respective crosslinkable functional groups.

* * * * *